United States Patent
Kent

(10) Patent No.: US 8,653,985 B2
(45) Date of Patent: Feb. 18, 2014

(54) SHUTDOWN SYSTEM

(75) Inventor: Ian Kent, Bristol (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 1184 days.

(21) Appl. No.: 12/233,099

(22) Filed: Sep. 18, 2008

(65) Prior Publication Data

US 2009/0079583 A1    Mar. 26, 2009

(51) Int. Cl.
*G01V 3/00*     (2006.01)

(52) U.S. Cl.
USPC .......... 340/853.2; 166/335; 166/363; 166/72; 340/853.3

(58) Field of Classification Search
USPC ........ 340/853.2, 853.3; 166/66, 316, 72, 335, 166/363–364
See application file for complete search history.

(56) References Cited

U.S. PATENT DOCUMENTS

| 3,894,560 A | 7/1975 | Baugh |
| 4,757,314 A | 7/1988 | Aubin et al. |
| 2002/0100589 A1 | 8/2002 | Childers et al. |

FOREIGN PATENT DOCUMENTS

| GB | 2332220 A | 6/1999 |
| WO | 2005/111484 A2 | 11/2005 |
| WO | 2006059223 A2 | 6/2006 |
| WO | 2008/007859 A1 | 1/2008 |

OTHER PUBLICATIONS

Search Report issued in GB0718352.8; Oct. 23, 2008.
Bjorn Hoff, Richard Heyerdahl, and Robert R. Schumacher (Alliance Technology AS), OTC 13239, Experiences from setting Safety Integrity Level (SIL) Targets in the Offshore Petroleum Industry, 2001, Offshore Technology Conference, 5 pages.
P. Roberts, and R. Phillips (Vetco Gray Controls), SPE 96757, Delivering a HIPPS Safety Critical Control System, 2005, Society of Petroleum Engineers, 7 pages.
W. Acworth (Vetco Gray Controls Ltd, UK), Ultra Long Offset 'Subsea to Beach' Controls Technology—Case Study, Statoil Snohvit, 13 pages.
S. Corneliussen (FMC Kongsberg Subsea), KOS 200, the Subsea Control System for the Millenium, SCADA 2002, 11 pages.
Jean-Pierre Signoret (Total), OTC 18504,High-Integrity Protection Systems (HIPS): Methods and Tools for Efficient Safety Integrity Levels Analysis and Calculations, 2007, Offshore Technology Conference, 6 pages.

*Primary Examiner* — Albert Wong
(74) *Attorney, Agent, or Firm* — Bracewell & Giuliani LLP

(57) ABSTRACT

A production shutdown system for an underwater hydrocarbon production facility, comprising, on the topside:
a safety system, and
a communications module;
and, underwater;
drive control means, and
an underwater communications component;
wherein in use safety signals are passed from the safety system to the drive control means via the topside communications module and the underwater communications component, and wherein the safety system and drive control means are rated according to a prescribed safety level but the communications module and underwater communications component are not so rated.

20 Claims, 1 Drawing Sheet

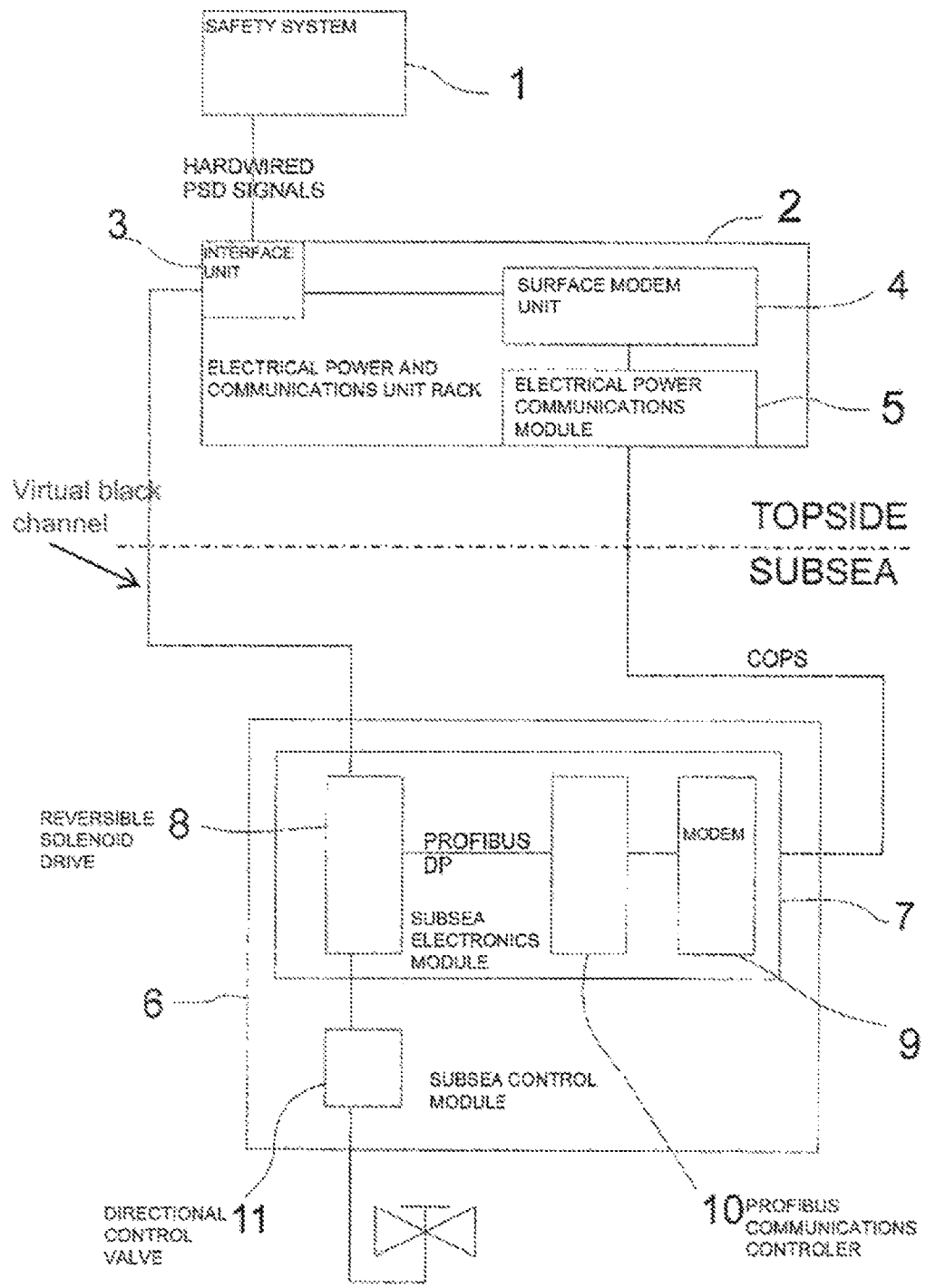

SHUTDOWN SYSTEM

This invention relates to a shutdown system for an underwater, for example subsea, hydrocarbon production facility.

Due to the use of non-safety-rated components, it can be challenging to implement a Safety Integrity Level (SIL) rated production shutdown system as may be required by subsea production control system guidelines.

The usual solution is to rate all the components within the production control system, thereby rating the entire loop. However, this may not be feasible where specific software components are used, such as some operating systems, or where third party electronics reside within the Subsea Electronics Module (SEM) or within the Master Control Station (MCS).

It is an aim of the present invention to provide a SIL-rated shutdown system in which it is not necessary to rate the entire loop, but rather only the components at each end of the system need be rated. This is achieved using a theoretical "Black Channel" between an interface unit on the surface and SIL-rated components mounted in the SEM. The rest of the system is seen as unreliable from a safety perspective and treated accordingly.

In accordance with a first aspect of the present invention there is provided a production shutdown system for an underwater hydrocarbon production facility, comprising, on the
  topside:
  a safety system, and
  a communications module;
  and, underwater;
  drive control means, and
  an underwater communications component;
wherein in use safety signals are passed from the safety system to the drive control means via the topside communications module and the underwater communications component, and wherein the safety system and drive control means are rated according to a prescribed safety level but the communications module and underwater communications component are not so rated.

In accordance with a second aspect of the present invention, there is provided a method for enabling shutdown of an underwater hydrocarbon production facility, comprising the step of:
  passing safety signals from a topside safety system to an underwater drive control means via an underwater control system, wherein the topside safety system and underwater drive control means are rated according to a prescribed safety level but the underwater control system is not so rated.

The invention will now be described, by way of example, with reference to the accompanying drawings; in which:

FIG. 1 schematically shows a subsea system in accordance with the present invention.

Looking now at FIG. 1, a SIL-rated safety system 1 is located topside, on a platform. This is hardwired to a SIL-rated Interface Unit (SRIU) 3 located at the surface as part of an Electrical Power and Communications Unit (EPCU) rack 2. This receives hard-wired inputs from a safety system 1 which indicates when a Process Shut Down (PSD) is to be performed. The interface unit 3 sits on a Master Control Station (MCS) network for communications subsea.

The SRIU 3 cyclically sends communications packets via the MCS network to a Surface Modem Unit (SMU) 4, using the Transmission Control Protocol/Internet Protocol (TCP/IP). The MCS communicates with the SMU directly via Object Linking and Embedding for Process Control (OPC). When a packet is received by the SMU 4, the SMU 4 schedules this for inclusion in the subsea communications. On receiving the packet, after the message has been validated, the packet is passed, via an Electrical Power Communications Module (EPCM) 5 located in the EPCU rack 2 to a SIL-rated Directional Control Valve (DCV) controller card for analysis.

The packet is transmitted using a Communications on Power System (COPS) to a Subsea Electronics Module (SEM) 7 located at a Subsea Control Module (SCM) 6. The packet is received by a modem 9 in the SEM 7 and passed to a Profibus Communications Controller (PCC) 10. It is then sent to a drive control means, comprising a SIL-rated Reversible Solenoid Drive (RSD) 8 with its associated DCV controller card, using Profibus Decentralised Peripherals (Profibus-DP). The SIL RSD 8 is in turn linked to a DCV 11 which is capable of effecting venting of the system.

The data packet is designed in such a manner that corruption of the packet is detected over and above traditional message checksums. Examples of this include repeated data, inversions of the data, cycle counters such that lost frames may be detected, and cyclic redundancy checks. The SIL-rated controller card only processes packets that pass all data consistency validation tests. The command data is kept as simple as possible, with the command data either indicating that the SIL-rated DCV controller card should "stay as is", i.e, do not shut down, or to initiate a shut down by venting the SIL DCV 11. Normal subsea communications are used to open the DCV 11.

In the event that the SIL RSD 8 does not receive a command within a prescribed time frame, it autonomously vents the system.

It can be seen that many components of the subsea control system, e.g. the SMU 4, EPCM 5, modem 9 and PCC 10, are not integral parts of the safety system, but merely form a conduit for the safety data, and as such system this does not require SIL certification. The SIL command process is therefore effectively via a theoretical "black channel" between the SIL-rated interface unit 3 on the surface and the SIL RSD 8 in the Subsea Electronics Module (SEM) 7.

Although only one Subsea Control Module (SCM) 6 is shown in FIG. 1 for clarity, there is typically more than one such SCM in a subsea production control system, each of which being hardwired to the safety system 1.

The above embodiment is exemplary only, and various alternatives are possible within the scope of the claims.

I claim:

1. A production shutdown system for an underwater hydrocarbon production facility, comprising,
  on the topside:
    a safety system,
    a communications module, and
    an interface unit operably coupled with the safety system and in communication with the communications module;
  underwater:
    drive control means comprising a reversible solenoid drive and associated directional control valve controller card, and
    an underwater communications component;
  a safety communication channel extending between the topside interface unit and the underwater directional control valve controller card via the topside communications module and the underwater communications component, configured to pass safety signals received from the safety system to the directional control valve controller card, and
  wherein the safety system, the interface unit, and the reversible solenoid drive and associated directional control valve controller card are rated according to a prescribed safety integrity level (SIL) but the communications module and underwater communications component are not so rated, to thereby provide to SIL rated production shutdown system having both SIL rated components and a substantial number of non-SIL rated communication components.

2. A method for enabling shutdown of an underwater hydrocarbon production facility, the method comprising the steps of:
provide a topside safety system and underwater drive control means, each rated according to a prescribed safety integrity level (SIL);
providing a topside communications module and an underwater communications component, each being not rated according to a prescribed safety integrity level; and
passing safety signals from the topside SIL rated system to the underwater SIL rated drive control means via a safety communications channel comprising the topside non-SIL rated communications module and the underwater non-SIL rated communications component.

3. The production shutdown system as defined in claim 1,
wherein the topside communications module comprises one or more of the following: a non-SIL rated electrical power communications module and a non-SIL rated modem unit in communication with both the SIL rated interface unit and the non-SIL rated electrical power communications module;
wherein the underwater communications component comprises one or more of the following: a non-SIL rated modem and a non-SIL rated profibus communications controller in communication with both the non-SIL rated modem and the SIL rated directional control valve controller card; and
wherein the production shutdown system further comprises:
a topside communications unit rack carrying the SIL rated interface unit, the non-SIL rated surface modem unit, and the non-SIL rated electrical power communications module, and
an underwater subsea electronics module including the non-SIL rated modem, the non-Sit rated profibus communications controller, the SIL rated directional control valve controller card, and the SIL rated reversible solenoid drive.

4. The production shutdown system as defined in claim 3, wherein the safety communications channel extends between the topside SIL rated safety system and the underwater SIL directional control valve controller card interface unit via the topside SIL rated interface unit, the topside non-SIL rated surface modem unit, the topside non-SIL rated electrical power communications module, a non-SIL rated communications on power system, the underwater non-SIL rated modem, and the underwater non-SIL rated profibus communications controller, the topside non-SIL rated surface modem unit, the topside non-SIL rated electrical power communications module, the underwater non-SIL rated modem, and the underwater non-SIL rated profibus communications controller, not essential to safety and thereby not requiring SIL certification.

5. The production shutdown system as defined in claim 1, wherein the communications channel comprises a communications pathway extending between the SIL rated interface unit and the SIL rated directional control valve controller card further via the non-SIL rated communications module, a non-SIL rated communications on power system, and the non-SIL rated underwater communications component to form a black channel therebetween.

6. The method as defined in claim 2,
wherein a topside SIL rated interface unit is connected to the topside SIL rated safety system;
wherein the drive control means further comprises an underwater SIL rated directional control valve controller card; and
wherein the safety communication channel extends between the topside SIL rated interface unit and the underwater SIL rated directional control valve controller card.

7. The method as defined in claim 2,
wherein the underwater drive control means comprises an underwater SIL rated directional control valve controller card; and
wherein the method further comprises the steps of:
providing a topside SIL rated interface unit operatively coupled with the topside SIL rated safety system, and
forming the communication channel between the topside SIL rated interface unit and the underwater SIL rated directional control valve.

8. The method as defined in claim 7, wherein the step of forming the communication channel between the topside SIL rated interface unit and the underwater SIL directional control valve controller card includes extending the safety communications channel between the topside SIL rated interface unit and the underwater SIL rated directional control valve via a topside non-SIL rated surface modem unit, a topside non-SIL rated electrical power communications module, a non-SIL rated communications on power system, an underwater non-SIL rated modem, and an underwater non-SIL rated profibus communications controller.

9. The method as defined in claim 2, wherein the communications channel comprises a physical communications pathway extending between a SIL rated interface unit and the SIL rated directional control valve controller card via the topside non-SIL rated communications module, a non-SIL rated communications on power system, and the underwater non-SIL rated communications component to form a theoretical black channel therebetween.

10. The method as defined in claim 2, wherein the drive control means comprises an SIL rated reversible solenoid drive and associated SIL rated directional control valve controller card.

11. The method as defined in claim 10, further comprising the steps of:
providing a data packet providing indicia of a command to maintain the directional control valve in a present state, the data packet designed so that corruption of the packet is detected according to each of the following plurality of consistency validity tests: inversion of packet data, lost frames, and a failure of cyclic redundancy check;
receiving the data packet by the SIL rated directional control valve controller card;
applying each of the plurality of consistency validity tests to the received data packet;
processing the data packet when the data packet passes each of the plurality of consistency validity tests, rejecting the data packet otherwise; and
initiating a venting of the directional control valve responsive to failure to receive and process a valid data packet within a preselected time frame.

12. A method for enabling shutdown of an underwater hydrocarbon production facility, the method comprising the steps of:

implementing a safety integrity level (SIL) rated production shutdown system in accordance with industry subsea production control system guidelines, the step of implementing comprising:

providing the production shut down system, the production shutdown system including a topside end comprising one or more topside end components, an underwater end comprising one or more underwater end components, and a communication channel comprising a plurality of medial communication channel components operably positioned therebetween;

applying an SIL rating to each of the one or more topside end components;

applying an SIL rating to each of the one or more underwater end components; and not applying an SIL rating to either of the plurality of medial communication channel components, to thereby effectively form a theoretical black channel comprising non-SIL rated components extending between the SIL rated topside end components and the SIL rated underwater components.

13. The method as defined in claim 12, further comprising the step of:

passing safety-related data packets from the one or more topside end SIL rated components to the one or more underwater end SIL rated components via the plurality of non-SIL rated medial communications channel components.

14. The method as defined in claim 13, wherein the plurality of non-SIL rated medial communication channel components include a non-SIL rated topside communications module and a non-SIL rated underwater communications component.

15. The method as defined in claim 12, wherein the one or more SIL rated top end components comprise a topside safety system and a topside SIL rated interface unit connected to the topside SIL rated safety system; and wherein the one or more SIL rated underwater end components comprise an underwater drive control means including an underwater SIL rated directional control valve controller card.

16. The method as defined in claim 15, further comprising the steps of:

providing a data packet providing indicia of a command to maintain the directional control valve in a present state, the data packet designed so that corruption of the packet is detected according to each of the following plurality of consistency validity tests: inversion of packet data lost frames, and a failure of cyclic redundancy check;

receiving the data packet by the SIL rated directional control valve controller card;

applying each of the plurality of consistency validity tests to the received data packet;

processing the data packet when the data packet passes each of the plurality of consistency validity tests, rejecting the data packet otherwise; and initiating a venting of a directional control valve responsive to failure to receive and process a valid data packet within a preselected time frame.

17. The method as defined in claim 15, further comprising the step of:

forming the communication channel between the topside SIL rated interface unit and the underwater SIL rated directional control valve controller card.

18. The method as defined in claim 17, wherein the drive control means further comprises an SIL rated reversible solenoid drive associated with the SIL rated directional control valve controller card, and wherein the reversible solenoid drive is operably coupled to a non-SIL rated directional control valve.

19. The method as defined in claim 18, wherein the step of forming the communication channel between the topside SIL rated interface unit and the underwater SIL directional control valve controller card includes extending the communications channel between the topside SIL rated interface unit and the underwater SIL rated directional control valve controller card via a topside non-SIL rated surface modem unit, a topside non-SIL rated electrical power communications module, a non-SIL rated communications on power system, an underwater non-SIL rated modem, and an underwater non-SIL rated profibus communications controller.

20. The method as defined in claim 17, wherein the communications channel comprises a physical communications pathway extending between the SIL rated interface unit and the SIL rated directional control valve controller card via a topside non-SIL rated communications module, a non-SIL rated communications on power system, and an underwater non-SIL rated communications component to form the theoretical black channel therebetween.

* * * * *